United States Patent [19]

Erikson et al.

[11] 4,210,033
[45] Jul. 1, 1980

[54] ANTI-BACKLASH NUT

[75] Inventors: Kenneth W. Erikson, Merrimack; Keith W. Erikson, Nashua, both of N.H.

[73] Assignee: Kerk Motion Products, Inc., Nashua, N.H.

[21] Appl. No.: 907,518

[22] Filed: May 19, 1978

Related U.S. Application Data

[63] Continuation-in-part of Ser. No. 816,983, Jul. 19, 1977, abandoned.

[51] Int. Cl.² ............................................. F16H 55/18
[52] U.S. Cl. ................................. 74/424.8 A; 74/409; 74/441
[58] Field of Search ............ 151/21 R, 21 C; 74/441, 74/459, 89.15, 424.8 R, 409

[56] References Cited

U.S. PATENT DOCUMENTS

| | | | |
|---|---|---|---|
| 3,364,757 | 1/1968 | Sears | 74/89.15 |
| 3,656,358 | 4/1972 | Kopp | 74/89.15 |
| 3,831,460 | 8/1974 | Linley, Jr. | 74/459 |
| 3,977,269 | 8/1976 | Linley, Jr. | 74/441 |
| 4,131,031 | 12/1978 | Erikson et al. | 74/441 |

Primary Examiner—C. J. Husar
Assistant Examiner—Conrad Berman
Attorney, Agent, or Firm—Hamilton, Brook, Smith & Reynolds

[57] ABSTRACT

An anti-backlash nut is disclosed of the type which undergoes translational movement along a screw in response to relative rotational movement between the nut and screw. This anti-backlash nut has oppositely-directed longitudinal flexure members radially biased towards the screw to provide equal drag torque and minimum relative deflection for travel of the nut in either direction.

8 Claims, 5 Drawing Figures

ANTI-BACKLASH NUT

This is a continuation in part of application Ser. No. 816,983, filed July 19, 1977, now abandoned.

BACKGROUND OF THE INVENTION

1. Field of the Invention

This invention is in the field of anti-backlash nuts for providing uniform translational movement in either direction in response to rotation of a screw.

2. Description of the Prior Art

In many applications, it is important to drive an element of a machine along a screw with accurate positional repeatability and constant drag torque in the forward and reverse direction. Data printers and x-y tables, used as peripheral equipment in the computer industry, for example, have such requirements.

Positioning devices designed to meet these requirements have been proposed, and many of these employ an anti-backlash nut to achieve the positional accuracy along the screw which is required. Examples of two such anti-backlash unit assemblies which have been proposed are described in the patent literature as follows.

In U.S. Pat. No. 3,656,358, issued to Kopp, a linear positioning device is disclosed which is stated to have an improved collar for use with a comparatively inexpensive rod having multiple grooves. The collar is telescoped over and adapted to be translated back and forth relative to the elongated rod. This collar includes cantilevered fingers which are resiliently wedged into angularly spaced grooves formed in the rod to preload the collar onto the rod and prevent rotational play from developing between the two. In a specific embodiment, the collar is telescoped onto a rod in the form of a splined shaft while in another embodiment, the collar is a nut threaded onto a screw with multiple threads.

In U.S. Pat. No. 3,977,269, issued to Linley, an anti-backlash, self-aligning nut construction with specially constructed tubular nut bodies which coact with concentric spring sleeves is described. The nut bodies, in general, each have a pair of spring-biased elements provided with internal thread formations adapted for engagement with the external threads of a screw. In one embodiment, a self-aligning spring sleeve is provided having solely three pairs of oppositely-disposed transverse slots to obtain the desired aligning features. The nut body has a base portion which is separated from the spring-biased elements by means of two transverse slots which, together with an adjacent pair of slots in the spring sleeve, form in effect, a universal joint. One of the remaining slot pairs in the sleeve is oriented circumferentially with respect to the first pair by an angle of 90°, with a third pair of slots being circumferentially aligned with the first pair.

Despite such prior proposals, none of the anti-backlash nut assemblies heretofor proposed has been entirely satisfactory. There is still a need for an anti-backlash nut which provides outstanding positional accuracy as it moves in a forward and reverse translation along a screw in response to rotation of the screw.

SUMMARY OF THE INVENTION

This invention relates to an anti-backlash nut designed to undergo translational movement along an externally threaded screw in response to relative rotational movement therebetween. The nut has a hollow cylindrical bore with an internal thread complementary to the external thread of the screw. The nut has at least one continuous portion which extends longitudinally from one end of the screw to the other. In the case where there is only one continuous portion, it preferably extends circumferentially for at least about 90°. In addition, there are a least two, and usually more, oppositely-directed longitudinal flexure members which have one end fixed to the anti-backlash nut and one end free-floating. These oppositely-directed longitudinal flexure members are biased towards the screw by one or more radial springs or other means for biasing.

It has been found that the oppositely-directed longitudinal flexure members overcome diametral variations in the external thread of the screw and do not cause binding or erratic torque response as the nut moves in either direction These oppositely-directed longitudinal flexure members also provide a balanced system of equal magnitude for traversal in either direction. Additionally, the spring or other means for biasing provide preload forces for the elements against the external thread of the screw flank which minimize backlash.

DESCRIPTION OF PREFERRED EMBODIMENTS

This invention can be further described by referring to the Figures in more detail.

Figure 1:
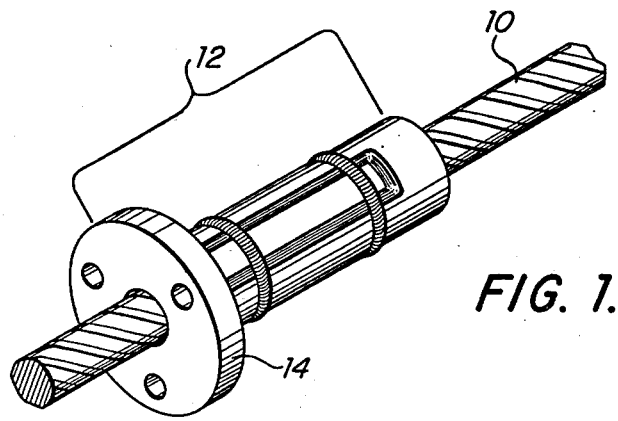
FIG. 1 is a perspective view illustrating an anti-backlash nut and screw assembly according to this invention.

FIG. 1 illustrates, in a perspective view, an externally threaded screw 10 having thereon an anti-backlash nut 12 according to this invention. Anti-backlash nut 12 has a faceplate 14 integrally attached to it and containing three equally spaced attachment holes so that an element to be driven can be easily attached to nut 12 by bolting it thereto. As relative rotational movement occurs between screw 10 and nut 12, nut 12 undergoes translational movement along screw 10 and thus drives the element fastened to it in a longitudinal direction. If the relative rotational movement is then reversed, such as by rotating screw 10 in the opposite direction, nut 12 undergoes translational movement in the reverse longitudinal direction. As stated previously, it is quite often important to achieve highly accurate positioning of nut 12 in both longitudinal directions in response to the same degree of rotation of screw 10, and the anti-backlash nut of this invention has a unique design to achieve this.

Figure 2:
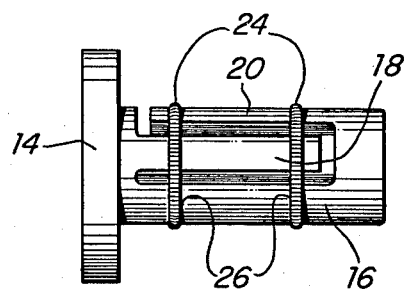
FIG. 2 is a side elevational view of an anti-backlash nut according to this invention.
Figure 3:
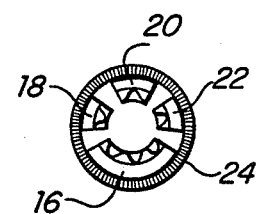
FIG. 3 is a cross-sectional view of an anti-backlash nut according to this invention.

The design features of anti-backlash nut 12 can be more clearly seen in FIGS. 2 and 3. Therein, it can be seen that continuous portion 16 extends from one end to the other of nut 12 in the longitudinal direction. The extent to which continuous portion 16 extends circumferentially will vary depending upon the exact application for anti-backlash nut 12, but is chosen to provide sufficient flexural stiffness while still allowing for relief of screw thread inconsistencies without significant binding. If there is only one continuous portion and the nut is relatively small, it it preferred to have the continuous portion extend for about 90°, and even more in many cases. If, on the other hand, there is more than one continuous portion, these can be designed to extend circumferentially for less than 90°.

Anti-backlash nut 12 has three oppositely-directed longitudinal flexure members, 18, 20 and 22. Flexure members 18 and 22 are fixed at the end of anti-backlash nut 12 at which faceplate 14 is attached, whereas flexure member 20 is fixed at the other end thereof. Each of flexure members 18, 20 and 22 extend longitudinally for a substantial length, but are free-floating at their far ends. They could, of course, be shorter than shown.

Radial springs 24 are positioned in slots 26 extending around the periphery of anti-backlash nut 12. The purpose of springs 24 is to bias flexure members 18, 20 and 22 towards screw 10 so that good contact is always maintained between the external thread on screw 10 and the complementary internal threads on flexure members 18, 20 and 22 and continuous portion 16.

Figure 4:
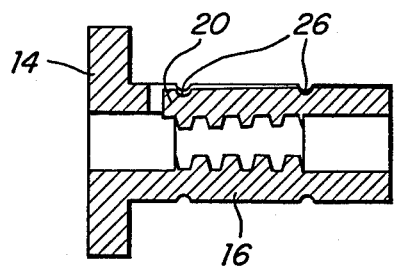
FIG. 4 is a cut-away side view illustrating the operation of a longitudinal flexure member as the nut travels along the screw in one direction; and, FIG. 5 is a cut-away side view illustrating the operation of an oppositely directed flexure member as the nut travels in the other direction.
Figure 5:
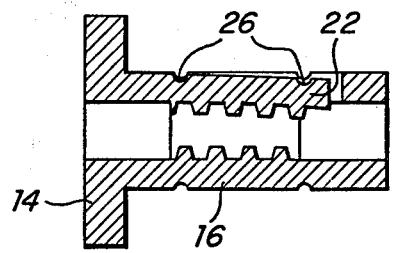

The operation of anti-backlash nut 12 is further illustrated in FIGS. 4 and 5. In FIG. 5, nut 12 has been rotated about 45° with regard to its position in FIG. 4 to better illustrate its operation. As can be seen, radial flexure members 20 and 22 are biased towards screw 10 by springs 24 so that the flanks of the internal threads thereon make good contact with the flanks of the external thread on screw 10. Because flexure members 20 and 22 have a free floating end and a certain degree of flexibility, good contact is always maintained despite inconsistencies in the external thread on screw 10. This serves to eliminate binding and resulting erratic torque response due to such inconsistencies.

While three oppositely-directed flexural members have been illustrated in the Figures, it is clear that there can be more or less. The minimum number, of course, is two since there must be one extending in each longitudinal direction. The length in both the longitudinal and radial directions are determined by factors while relate to the ultimate application. It is usually preferred, however, to design these oppositely-directed longitudinal flexure members to minimize rotational moments.

Anti-backlash nut 12 can be fabricated from a wide variety of materials including many metals and polymeric compositions. A preferred material is a polymeric composition which has low friction and is self-lubricating. The flexure members can be molded into the nut, or the nut can be molded as a solid tubular member in which case flexures can be provided by milling slots in an appropriate configuration into the tubular body. Similarly, the nut can be molded with internal threads using traditional molding procedures, or the nut can be molded without internal threads which are then subsequently provided by chasing or tapping the cylinrical bore.

Those skilled in the art will recognize, or be able to ascertain using no more than routine experimentation, many equivalents to the specific components, elements, steps, materials, etc., descrbied herein. Such equivalents are intended to be covered by the following appended claims.

What is claimed is:

1. An anti-backlash nut designed to undergo translational movement along a screw having an external thread thereon in response to relative rotational movement between the anti-backlash nut and screw, said nut having a hollow cylindrical bore with an internal thread complementary to the external thread on the screw and said nut comprising, in combination:
   a. a continuous portion extending longitudinally from one end of said nut to the other and thereof;
   b. oppositely-directed longitudinal flexure members, said flexure members having one end fixed to said anti-backlash nut and their other end free-floating; and,
   c. means for biasing said oppositely-directed longitudinal flexure members towards the external thread of said screw.

2. An anti-backlash nut of claim 1 having a total of three oppositely directed flexure members.

3. An anti-backlash nut of claim 1 wherein said means for biasing comprises at least one spring running around the outer periphery of said anti-backlash nut.

4. An anti-backlash nut of claim 3 wherein said spring is positioned in a slot extending around the outer periphery of said anti-backlash nut.

5. An anti-backlash nut of claim 4 additionally including a faceplate fastened to one end thereof.

6. An anti-backlash nut of claim 5 having a total of three oppositely-directed longitudinal flexure members, two of which are fixed to the end of said nut at which the faceplate is located with the other flexure member being fixed at the other end therof.

7. An anti-backlash nut of claim 1 formed from a low-friction, self-lubricating polymeric material.

8. An anti-backlash nut of claim 6 formed from a low-friction, self-lubricating polymeric material.

* * * * *